(12) United States Patent
Furuta et al.

(10) Patent No.: US 10,190,469 B2
(45) Date of Patent: Jan. 29, 2019

(54) FAILURE DETECTION DEVICE OF INTERNAL COMBUSTION ENGINE

(71) Applicant: MITSUBISHI JIDOSHA KOGYO KABUSHIKI KAISHA, Tokyo (JP)

(72) Inventors: Katsuhiro Furuta, Okazaki (JP); Kazumichi Takahashi, Obu (JP); Yuji Sato, Okazaki (JP); Junya Kitada, Okazaki (JP); Hideo Matsunaga, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 14/976,419

(22) Filed: Dec. 21, 2015

(65) Prior Publication Data

US 2016/0177817 A1 Jun. 23, 2016

(30) Foreign Application Priority Data

Dec. 22, 2014 (JP) .................................. 2014-259074

(51) Int. Cl.
*F01N 11/00* (2006.01)
*F02D 41/00* (2006.01)
(Continued)

(52) U.S. Cl.
CPC .......... *F01N 11/00* (2013.01); *F02D 41/0085* (2013.01); *F02D 41/1401* (2013.01);
(Continued)

(58) Field of Classification Search
CPC ................. F01N 11/00; F01N 2550/02; F01N 2560/025; F01N 2900/08; F01N 2900/10;
(Continued)

(56) References Cited

U.S. PATENT DOCUMENTS 5,331,560 A * 7/1994 Tamura .................. F01N 11/007
123/479
6,112,150 A * 8/2000 Irons ...................... F02D 41/266
701/114

(Continued)

FOREIGN PATENT DOCUMENTS

JP H06-017692 * 1/1994 ............. F02D 41/22
JP H06-071962 * 1/1994 ............. F02D 41/22

(Continued)

OTHER PUBLICATIONS

180220 JP 06-071962 English machine translation.*
180220 JP 06-017692 English machine translation.*

*Primary Examiner* — David Hamaoui
*Assistant Examiner* — Carl Staubach
(74) *Attorney, Agent, or Firm* — Birch, Stewart, Kolasch & Birch, LLP

(57) ABSTRACT

A deterioration determination unit determines whether a catalyst in an exhaust passage of an engine is deteriorated; a first determination unit determines whether there is an air-fuel ratio variation among cylinders of the engine on the basis of distortion in waveform of the air-fuel ratio on the upstream side of the catalyst; and a second determination unit determines whether there is an air-fuel ratio variation among the cylinders on the basis that the air-fuel ratio on the downstream side of the catalyst remains on the lean side. A determination mode switching unit makes the first determination unit execute a determination process concurrently with determination by the deterioration determination unit, and it is determined by the determination process that there is an air-fuel ratio variation among the cylinders, makes the second determination unit execute a determination process in priority to determination of deterioration of the catalyst.

4 Claims, 3 Drawing Sheets

(51) Int. Cl.
*F02D 41/14* (2006.01)
*F02D 41/02* (2006.01)
*F02D 41/24* (2006.01)

(52) U.S. Cl.
CPC ..... *F02D 41/1441* (2013.01); *F02D 41/1454* (2013.01); *F01N 2550/02* (2013.01); *F01N 2560/025* (2013.01); *F01N 2900/08* (2013.01); *F01N 2900/10* (2013.01); *F01N 2900/1402* (2013.01); *F02D 41/0235* (2013.01); *F02D 41/1495* (2013.01); *F02D 41/2454* (2013.01); *F02D 2041/1422* (2013.01); *F02D 2041/1432* (2013.01); *F05B 2270/1064* (2013.01); *Y02T 10/47* (2013.01)

(58) Field of Classification Search
CPC ..... F01N 2900/1402; F02D 2041/1422; F02D 2041/1432; F02D 41/0085; F02D 41/0235; F02D 41/1401; F02D 41/1441; F02D 41/1454
See application file for complete search history.

(56) References Cited

U.S. PATENT DOCUMENTS

| | | | | |
|---|---|---|---|---|
| 6,115,653 | A * | 9/2000 | Bergstrom | F02D 41/22 123/479 |
| 6,694,962 | B2 * | 2/2004 | Fujimoto | F02D 41/1408 123/688 |
| 2010/0191444 | A1 * | 7/2010 | Aoki | F01N 11/007 701/109 |
| 2011/0191005 | A1 * | 8/2011 | Iwazaki | F01N 11/00 701/101 |
| 2011/0295491 | A1 * | 12/2011 | Kurahashi | F02D 41/0085 701/103 |
| 2013/0018568 | A1 * | 1/2013 | Takada | F02D 41/1441 701/103 |
| 2013/0275024 | A1 * | 10/2013 | Nakagawa | F02D 41/1441 701/102 |

FOREIGN PATENT DOCUMENTS

| | | |
|---|---|---|
| JP | 2000-120431 A | 4/2000 |
| JP | 2009-30455 A | 2/2009 |

* cited by examiner

FAILURE DETECTION DEVICE OF INTERNAL COMBUSTION ENGINE

BACKGROUND OF THE INVENTION

Field of the Invention

The present invention relates to a failure detection device which detects an air-fuel ratio variation among cylinders and catalyst deterioration of an internal combustion engine.

Description of the Related Art

Generally, in a multi-cylinder internal combustion engine, all the cylinders are controlled in the same amount to control the air-fuel ratio. Accordingly, if the fuel injection system of one cylinder fails, for example, the actual air-fuel ratio may vary significantly among the cylinders (hereinafter referred to as an air-fuel ratio variation). Since such a situation leads to deterioration of exhaust emissions, the law requires that engines have a function to detect on-board an air-fuel ratio variation among the cylinders and indicate the failure.

For example, in the multi-cylinder internal combustion engine described in Japanese Patent Laid-Open No. 2009-30455, an air-fuel ratio variation among the cylinders is detected by taking advantage of the characteristic that the amount of hydrogen generated in the combustion chamber increases quadratically as the amount of variation of the air-fuel ratio toward the rich side increases. Even when the total air-fuel ratio after merging of exhaust gas streams from all the cylinders is the same, if a variation toward the rich side occurs in the air-fuel ratio of only one cylinder, the amount of hydrogen generated increases more than when a variation toward the rich side occurs evenly in all the cylinders, and as the oxygen concentration in exhaust gas decreases by the amount of that increase, the output of an LAF sensor on the upstream side of the catalyst varies toward the rich side. By contrast, the output of an $O_2$ sensor on the downstream side of the catalyst assumes a true value free of the influence of hydrogen, since hydrogen is purified in the catalyst.

As a result of main air-fuel ratio feedback control based on the output of the LAF sensor, the output of the LAF sensor assumes a value, which is apparently equivalent to stoichiometry, despite the variation toward the rich side under the influence of hydrogen, while the output of the $O_2$ sensor assumes a value further on the lean side than the stoichiometry which is the true air-fuel ratio. Accordingly, in auxiliary air-fuel ratio feedback control based on the output of the $O_2$ sensor, the learned value of a stoichiometry correction factor is gradually adapted toward the rich side so as to offset the variation toward the lean side of the output of the $O_2$ sensor, and the median value of the output of the LAF sensor is corrected. When that learned value of the stoichiometry correction factor exceeds a predetermined value, it is regarded that an air-fuel ratio variation among the cylinders has occurred, and it is determined that there is a failure.

In a multi-cylinder internal combustion engine, since exhaust gas streams from the cylinders are merged in the exhaust manifold, the length of the exhaust gas circulation path differs among the cylinders, and accordingly the exhaust gas streams hit the LAF sensor to different degrees from one cylinder to another. For this reason, a quick failure determination cannot always be expected even when an air-fuel ratio variation occurs between one cylinder and the other cylinders. To address such cases, the learning sensitivity of the learned value of the stoichiometry correction factor based on the output of the $O_2$ sensor is set to the sensitive side, so that, relative to the same output variation of the $O_2$ sensor, the learned value of the stoichiometry correction factor is increased more rapidly than when the learning sensitivity is set to normal learning sensitivity.

Failure detection of an internal combustion engine includes not only determination of an air-fuel ratio variation among the cylinders as described above but also determination of catalyst deterioration, and determination of that failure is also required by law. Determination of catalyst deterioration takes advantage of a phenomenon that the fluctuation frequency of the exhaust gas air-fuel ratio on the downstream side of the catalyst increases gradually (approaches the fluctuation frequency of the exhaust gas air-fuel ratio on the upstream side) as the catalyst deteriorates, and determination of catalyst deterioration is executed on the basis of an increase in the ratio between the fluctuation frequency of the air-fuel ratio on the downstream side of the catalyst and the fluctuation frequency of the air-fuel ratio on the upstream side (=the fluctuation frequency of the $O_2$ sensor output/the fluctuation frequency of the LAF sensor output).

However, determination of catalyst deterioration cannot be executed properly, if the learning sensitivity of the learned value of the stoichiometry correction factor is set as described above to the sensitive side in order to determine whether or not there is an air-fuel ratio variation among the cylinders.

As the catalyst deteriorates, the output of the $O_2$ sensor on the downstream side of the catalyst tends to remain on the lean side. If the learning sensitivity of the learned value of the stoichiometry correction factor is a normal value, the exhaust gas air-fuel ratio on the downstream side of the catalyst shows a fluctuation state according to the deterioration of the catalyst, so that whether or not the catalyst is deteriorated can be determined without any problem. If the learning sensitivity is set to the sensitive side, however, the median value of the LAF sensor is corrected on the basis of the learned value of the stoichiometry correction factor which has been adapted excessively toward the rich side, so that the actual air-fuel ratio is controlled improperly toward the rich side.

Consequently, the output of the LAF sensor fluctuates near the stoichiometry, while the output of the $O_2$ sensor shifts to the detection limit on the rich side, inevitably causing a significant reduction of the amplitude of the output fluctuation, which makes it difficult to count the fluctuation frequency. Accordingly, the ratio of the fluctuation frequency does not despite the deteriorating catalyst, and proper determination of deterioration can no longer be expected.

That is, if the learning sensitivity of the learned value of the stoichiometry correction factor based on the output of the $O_2$ sensor is set to a normal characteristic, determination of catalyst deterioration is allowed but determination of an air-fuel ratio variation among cylinders is not allowed. Conversely, if the learning sensitivity is set to the sensitive side, determination of an air-fuel ratio variation among cylinders is allowed but determination of catalyst deterioration is not allowed. Thus, determination of catalyst deterioration and determination of an air-fuel ratio variation are placed in a trade-off relation.

SUMMARY OF THE INVENTION

Having been devised to solve this problem, the present invention aims to provide a failure detection device of an internal combustion engine which, while allowing determination of catalyst deterioration, can properly determine that there is a failure in terms of an air-fuel ratio variation among cylinders when such an air-fuel ratio variation occurs.

To achieve the above object, a failure detection device of an internal combustion engine of the present invention includes: a catalyst provided in an exhaust passage of an internal combustion engine having a plurality of cylinders; an upstream-side air-fuel ratio detection unit which detects an air-fuel ratio on an upstream side of the catalyst; a downstream-side air-fuel ratio detection unit which detects an air-fuel ratio on a downstream side of the catalyst; a deterioration determination unit which determines whether or not the catalyst is deteriorated; a first air-fuel ratio variation determination unit which determines whether or not there is an air-fuel ratio variation among the cylinders of the internal combustion engine on the basis of distortion in waveform of the air-fuel ratio on the upstream side of the catalyst detected by the upstream-side air-fuel ratio detection unit; a second air-fuel ratio variation determination unit which determines whether or not there is an air-fuel ratio variation among the cylinders on the basis that the air-fuel ratio on the downstream side of the catalyst, detected by the downstream-side air-fuel ratio detection unit, remains on the lean side; and a determination mode switching unit which makes the first air-fuel ratio variation determination unit execute a determination process concurrently with determination of deterioration of the catalyst by the deterioration determination unit, and if it is determined by the determination process that there is an air-fuel ratio variation among the cylinders, makes the second air-fuel ratio variation determination unit execute a determination process in priority to determination of deterioration of the catalyst.

According to the failure detection device of an internal combustion engine thus configured, it is possible to determine whether or not there is an air-fuel ratio variation among the cylinders by the first air-fuel ratio variation determination unit concurrently with determination of catalyst deterioration, and if it is determined by this determination process that there is an air-fuel ratio variation, whether or not there is an air-fuel ratio variation among the cylinders is determined with higher reliability by the second air-fuel ratio variation determination unit in priority to determination of catalyst deterioration.

Therefore, according to the failure detection device of an internal combustion engine of the present invention, it is possible to properly determine that there is a failure in terms of an air-fuel ratio variation among cylinders when such an air-fuel ratio variation occurs, while allowing determination of catalyst deterioration.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

In the following, an embodiment of the present invention will be described on the basis of the accompanying drawings.

Figure 1:
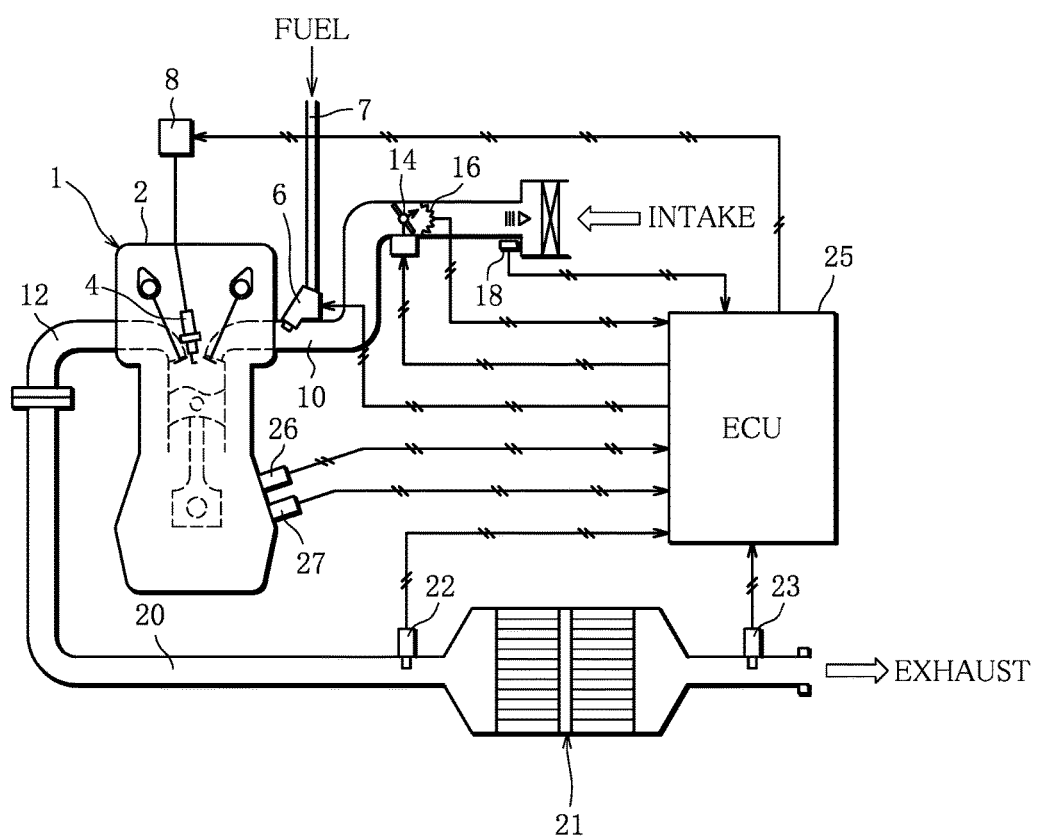
FIG. 1 is a schematic configurational view showing a failure detection device of an engine of an embodiment.

FIG. 1 is a schematic configurational view showing a failure detection device of an engine of this embodiment.

An engine 1 (internal combustion engine), which is equipped with the failure detection device according to this embodiment, is a straight four-cylinder engine. In FIG. 1, while the internal configuration of one cylinder is shown, the other cylinders have the same structure, and the four cylinders are disposed in series.

As shown in FIG. 1, the engine 1 according to this embodiment is a multi point injection (MPI) gasoline engine. Since the MPI engine is publicly known, detailed description of its configuration is omitted here.

An ignition plug 4 is mounted for each cylinder in a cylinder head 2 of the engine 1, and the ignition plug 4 is connected with an ignition coil 8 which outputs a high voltage. An intake port is formed for each cylinder in the cylinder head 2, and one ends of an intake manifold 10 are connected respectively with the intake ports so as to communicate with each other. An electromagnetic fuel injection valve 6 is mounted on the intake manifold 10, and the fuel injection valve 6 is connected through a fuel pipe 7 with a fuel supply device (not shown) having a fuel tank. The fuel injection valve 6 is provided for the intake port of each cylinder, so that fuel can be supplied independently to intake air flowing into each cylinder.

Further on the upstream side of the intake manifold 10 than the fuel injection valve 6, an electromagnetic throttle valve 14 which adjusts the amount of intake air is provided, and a throttle position sensor (TPS) 16 which detects the valve opening degree of the throttle valve 14 is provided alongside the throttle valve 14. On the upstream side of the throttle valve 14, an airflow sensor 18 which measures the amount of intake air is installed.

An exhaust port is formed for each cylinder in the cylinder head 2, and one ends of an exhaust manifold 12 are connected respectively with the exhaust ports so as to communicate with each other.

The other end of the exhaust manifold 12 is connected with an exhaust pipe 20 (exhaust passage), and a three-way catalyst 21 as an exhaust purifying catalytic device is installed in this exhaust pipe 20. Further on the upstream side of the exhaust pipe 20 than the three-way catalyst 21, an LAF sensor 22 (an air-fuel ratio sensor; an upstream-side air-fuel ratio detection unit of the present invention) which detects the air-fuel ratio of exhaust is provided, and further on the downstream side of the exhaust pipe 20 than the three-way catalyst 21, an $O_2$ sensor 23 (an oxygen sensor; a downstream-side air-fuel ratio detection unit of the present invention) which detects the air-fuel ratio of exhaust (oxygen concentration in exhaust) is provided.

An engine control unit (ECU) 25 includes an input/output device, a memory device (ROM, RAM, non-volatile RAM, etc.), a central processing unit (CPU), a time counter, etc., and this ECU 25 performs comprehensive control of the exhaust purifying device including the engine 1.

Other than the above-mentioned TPS 16, airflow sensor 18, LAF sensor 22, and $O_2$ sensor 23, various sensors, such as a crank angle sensor 26 which detects the crank angle of the engine 1 and a water temperature sensor 27 which detects cooling water temperature in the engine 1, are connected on the input side of the ECU 25, and detection information from these sensors is input into the ECU 25. An engine speed Ne is detected on the basis of the crank angle information from the crank angle sensor 26.

On the output side of the ECU 25, various output devices, such as the above-mentioned fuel injection valves 6 and ignition coils 8 of the cylinders and the throttle valve 14, are connected, and a fuel injection amount, a fuel injection timing, an ignition timing, etc. computed on the basis of the detection information from the various sensors are output respectively to these various output devices.

For example, for the fuel injection amount, air-fuel ratio feedback is executed so as to match the air-fuel ratio on the upstream side of the three-way catalyst 21 with the stoichiometry on the basis of the output of the LAF sensor 22, and at the same time, the learned value (counter) of the stoichiometry correction factor is adapted according to the air-fuel ratio on the downstream side of the three-way catalyst 21 on the basis of the output of the $O_2$ sensor 23, and the median value of the output of the LAF sensor 22 is corrected, so that the air-fuel ratio on the downstream side of the three-way catalyst 21 matches the stoichiometry. Thus, the ECU 25 functions as an air-fuel ratio feedback unit.

The ECU 25 also executes determination of deterioration of the three-way catalyst 21 (functions as a deterioration determination unit) during operation of the engine 1. For example, the ECU 25 determines whether or not the three-way catalyst 21 is deteriorated on the basis of an increase in the ratio between the fluctuation frequency of the air-fuel ratio on the downstream side of the catalyst and the fluctuation frequency of the air-fuel ratio on the upstream side (=the fluctuation frequency of the $O_2$ sensor output/the fluctuation frequency of the LAF sensor output).

As described in "Background of the invention", determining whether or not there is an air-fuel ratio variation among cylinders requires the learning sensitivity of the learned value of the stoichiometry correction factor to be set to the sensitive side, but the learning sensitivity on the sensitive side does not allow determination of catalyst deterioration, which places these determination of an air-fuel ratio variation and determination of catalyst deterioration in a trade-off relation.

In view of this inconvenience, the present inventors found measures involving an additional technique which can determine whether or not there is an air-fuel ratio variation among cylinders even under the control condition of normal learning sensitivity.

For example, as described in Japanese Patent Laid-Open No. 6-17692, it is also possible to determine whether or not there is an air-fuel ratio variation among cylinders on the basis of distortion in waveform of the air-fuel ratio on the upstream side of the three-way catalyst 21 (=distortion in output waveform of the LAF sensor 22). In the following description, a determination mode in which whether or not there is an air-fuel ratio variation among cylinders is determined by the technique described in Japanese Patent Laid-Open No. 6-17692, under the control condition of normal learning sensitivity, will be referred to as a temporary determination mode (first air-fuel ratio variation determination unit), and another determination mode in which whether or not there is an air-fuel ratio variation among cylinders is determined by the technique described in Japanese Patent Laid-Open No. 2009-30455, on the basis of the learned value of the stoichiometry correction factor under the control condition of higher learning sensitivity, will be referred to as a main determination mode (second air-fuel ratio variation determination unit).

According to the temporary determination mode, since it is not necessary to set the learning sensitivity to the sensitive side, determination of deterioration of the three-way catalyst 21 can be executed concurrently, while the reliability in determining whether or not there is an air-fuel ratio variation among cylinders is slightly lower than in the main determination mode. Therefore, during normal engine operation, normal learning sensitivity is used to determine whether or not there is an air-fuel ratio variation among cylinders in the temporary determination mode concurrently with determination of deterioration of the three-way catalyst 21, and if it is determined that there is an air-fuel ratio variation (hereinafter referred to as temporary determination), the determination mode is switched from the temporary determination mode to the main determination mode and the learning sensitivity is set to the sensitive side to determine whether or not there is an air-fuel ratio variation among cylinders again with higher reliability (hereinafter referred to as main determination). Details of this procedure will be given below.

Figure 2:
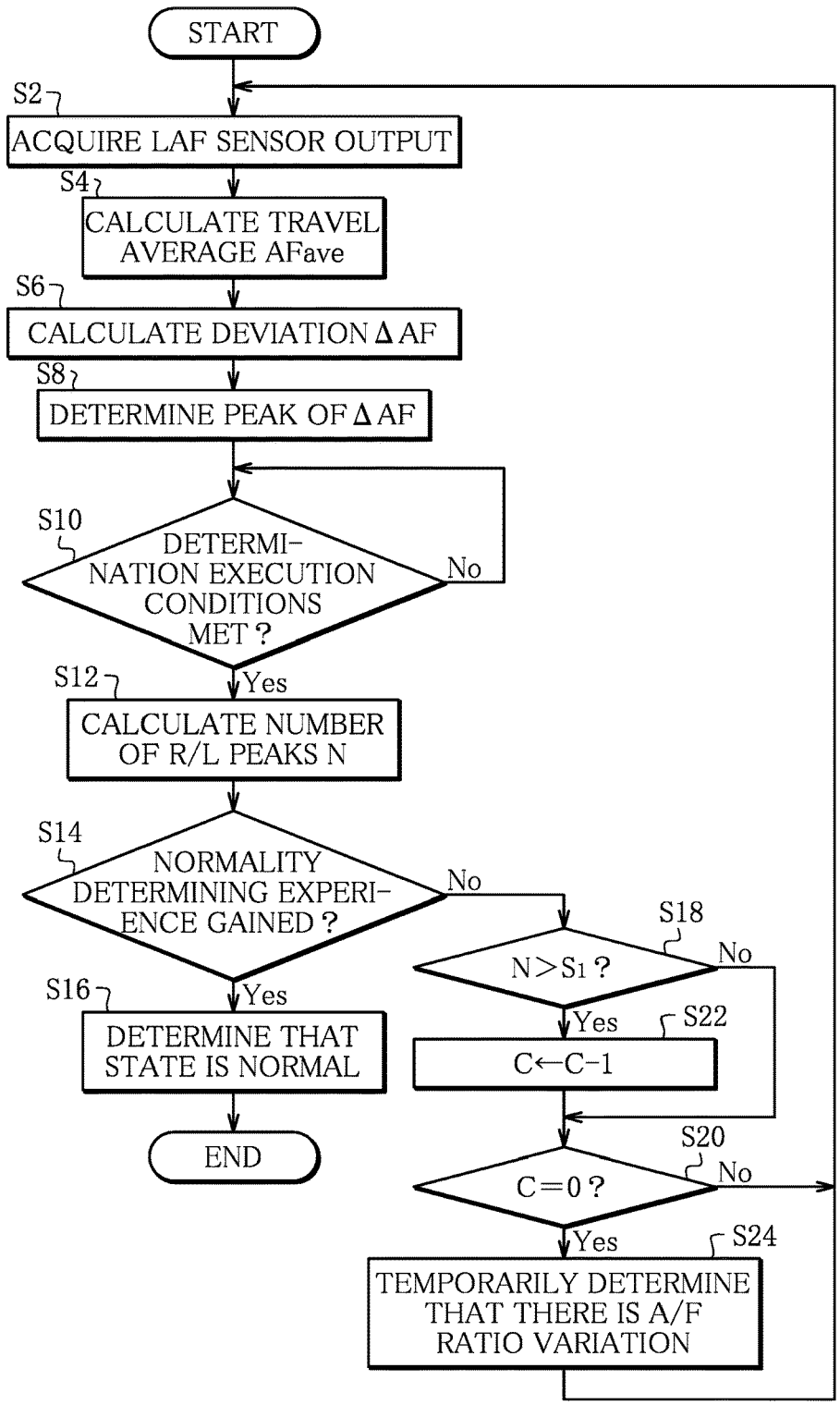
FIG. 2 is a flowchart showing a determination mode switching routine executed by an ECU.

FIG. 2 is a flowchart showing a determination mode switching routine executed by the ECU 25 to switch between the temporary determination mode and the main determination mode. When executing this routine, the ECU 25 functions as a determination mode switching unit of the present invention.

Now, it is assumed that the temporary determination mode under the control condition of normal learning sensitivity is being executed concurrently with determination of deterioration of the three-way catalyst 21, and that a switching determination counter C1 for determining whether or not to switch to the main determination mode is set to an initial value $C1_0$.

The ECU 25 first acquires an output AF of the LAF sensor 22 in step S2, and calculates a travel average AFave of five cycles of the acquired output AF in the subsequent step S4. The ECU 25 calculates a deviation ΔAF between the output AF of the LAF sensor 22 and the travel average AFave in step S6, and determines the peak of the deviation ΔAF in step S8.

In the subsequent step S10, the ECU 25 determines whether or not predetermined determination execution conditions are met, and if the answer is No (negative), the ECU 25 goes standby, and when the answer becomes Yes (affirmative), the ECU 25 proceeds to step S12 to calculate the number of times the peak of the deviation ΔAF deviates from the region between preset upper limit and lower limit toward the rich side or the lean side (hereinafter referred to as a number of R/L peaks N) during a sampling period in which the value of a sampling counter is reduced to zero. The condition that predetermined determination execution conditions are met means the condition that a vehicle is controlled in a predetermined driving state which allows determination of deterioration of the catalyst by the deterioration determination unit. The predetermined driving state is the state that fulfills one of following conditions. Those are, for example, a condition which a temperature of a cooling water of the engine is the predetermined temperature or higher than it, a condition which a temperature of a catalyst is the predetermined temperature or higher than it if a temperature of a catalyst can be estimated, and a condition which an integrating air amount is the predetermined amount or higher than it.

If an air-fuel ratio variation among the cylinders occurs, the output waveform of the LAF sensor 22 is distorted and a high-frequency component is contained in the waveform. As a result, the peak of the deviation ΔAF between the output AF of the LAF sensor 22 and the travel average AFave of five cycles deviates frequently from the region, so that the number of R/L peaks N during the sampling period increases. Thus, there is a correlation between the number of R/L peaks N during a sampling period and a high-frequency component contained in the output waveform, which allows the degree of an air-fuel ratio variation among the cylinders to be estimated from the number of R/L peaks N.

In the subsequent step S14, the ECU 25 determines whether or not a normality determining experience has been gained. This normality determining experience will be described later. In some cases, after a main determination that there is an air-fuel ratio variation among the cylinders is made in the main determination mode, the air-fuel ratio variation may be resolved for some reason. In such cases, while the determination mode is switched back to the temporary determination mode on the basis of the number of R/L peaks N, since normality has already been confirmed, it is concluded that there is no air-fuel ratio variation among the cylinders to eliminate the need for another temporary determination. Therefore, if the answer in step S14 is Yes, the ECU 25 proceeds to step S16, and promptly determines that the state is normal before ending the routine. In this case, therefore, the temporary determination mode is continued along with determination of deterioration of the three-way catalyst 21.

On the other hand, if the answer in step S14 is No, the ECU 25 proceeds to step S18, and determines whether or not the number of R/L peaks N during the sampling period is larger than a predetermined value S1. If the answer in step S18 is No, the ECU 25 proceeds to step S20 to determine whether or not the value of the switching determination counter C1 has been reduced to zero, and if the answer is No, the ECU 25 returns to step S2. If the answer in step S18 is Yes, the ECU 25 subtracts one from the value of the switching determination counter C1 in step S22 before proceeding to step S20.

When the value of the switching determination counter C1 has been reduced to zero, the ECU 25 proceeds from step S20 to step S24, and temporarily determines that there is an air-fuel ratio variation among the cylinders before returning to step S2. The learning sensitivity of the learned value of the stoichiometry correction factor is re-set to the sensitive side according to this temporary determination in the temporary determination mode, and at the same time the determination mode is switched to the main determination mode.

Next, the switching status of the determination mode on the basis of the above-described processing by the ECU 25 will be described in accordance with the time chart of FIG. 3.

This time chart shows the status when a vehicle is driven according to a predetermined drive pattern consisting of drive cycles 1 to 4 (D/C 1 to 4). In the drive cycle 1 (D/C 1), the temporary determination mode is executed concurrently with determination of deterioration of the three-way catalyst 21. The learning sensitivity of the learned value of the stoichiometry correction factor at this point is set to a normal value (corresponding to low sensitivity of the present invention) on the basis of the settings of a counter addition region and a counter subtraction region. On the basis of this learning sensitivity, the value of an enrichment process counter C2 (corresponding to a counter of the present invention) is increased/reduced to adapt the learned value of the stoichiometry correction factor.

Figure 3:
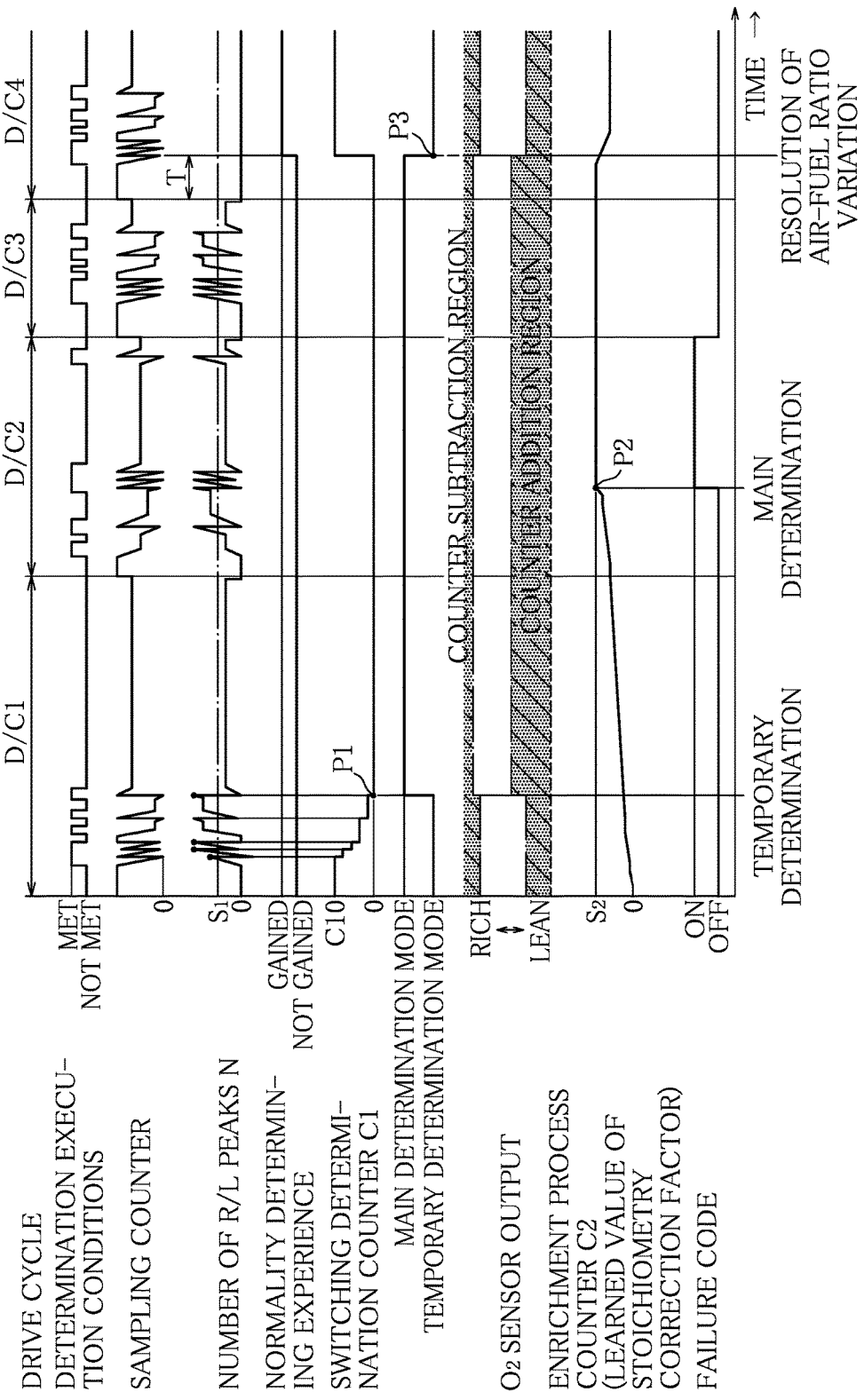
FIG. 3 is a time chart showing a determination mode switching status based on processing by the ECU.

More specifically, the counter addition region is set on the lean side and the counter subtraction region is set on the rich side across the dead zone in FIG. 3. Each time the output of the $O_2$ sensor 23 remains for a predetermined time in the counter addition region, the value of the enrichment process counter C2 is increased, and each time the output of the $O_2$ sensor 23 remains for a predetermined time in the counter subtraction region, the value of the enrichment process counter C2 is reduced. Then, the learned value of the stoichiometry correction factor is adapted according to the value of the enrichment process counter C2, and is used for correcting the median value of the output of the LAF sensor 22.

Concurrently with this process, the number of R/L peaks N based on the deviation $\Delta AF$ is calculated in each sampling period by the sampling counter, and the value of the switching determination counter C1 is reduced only in those sampling periods in which the number of R/L peaks N exceeds the predetermined value S1. Since a high-frequency component is contained in the output waveform of the LAF sensor 22 due to the air-fuel ratio variation among the cylinders, the value of the switching determination counter C1 is sequentially reduced to zero, and it is temporarily determined that there is an air-fuel ratio variation among the cylinders (P1 in FIG. 3).

The determination mode is switched from the temporary determination mode to the main determination mode according to this temporary determination, and the learning sensitivity of the learned value of the stoichiometry correction factor is re-set to the sensitive side (corresponding to high sensitivity of the present invention). More specifically, the counter addition region is enlarged, while the counter subtraction region is reduced. As a result, relative to the same output fluctuation of the $O_2$ sensor 23, the chance that the output fluctuation remains in the counter addition region becomes higher than when the learning sensitivity is set to normal learning sensitivity, so that the value of the enrichment process counter C2 is more likely to be increased, causing a rapid increase in learned value of the stoichiometry correction factor.

The value of the enrichment process counter C2 keeps increasing even after the vehicle proceeds to the drive cycle 2 (D/C 2), and reaches a predetermined value S2 which is set in advance (P2 in FIG. 3). At this point, a main determination that there is an air-fuel ratio variation among the cylinders is made, and a failure is indicated, for example, an indication light provided at the driver's seat is lit, on the basis of a failure code.

Meanwhile, the process of calculating the number of R/L peaks N on the basis of the deviation $\Delta AF$, which has been executed in the above-described temporary determination mode, is continued in the main determination mode as well. As described above, this process aims to switch the determination mode back to the temporary determination mode (and at the same time to resume determination of deterioration of the three-way catalyst 21). For example, if the number of R/L peaks N is not counted after a predetermined time T has elapsed since the start of a new drive cycle, it is regarded that the air-fuel ratio variation among the cylinders has been resolved, and the main determination mode is ended and the determination mode is switched back to the temporary determination mode. Accordingly, at this point, the learning sensitivity of the learned value of the stoichiometry correction factor is set back to a normal value, so that determination of deterioration of the three-way catalyst 21 can be resumed.

In the example of FIG. 3, since the number of R/L peaks N is frequently counted even after the start of the drive cycle 3 (D/C 3), the main determination mode is continued, and when the drive cycle 4 is started, since the number of R/L peaks N is not counted after the elapse of the predetermined time T, it is concluded that the air-fuel ratio variation has been resolved, and the determination mode is switched back to the temporary determination mode (P3 in FIG. 3). The normality determining experience has been gained at this timing, and in this drive cycle 4 (D/C 4), the ECU 25 proceeds from step S14 to step S16 of FIG. 2 to determine that the state is normal.

While not shown, if no air-fuel ratio variation among the cylinders as described above occurs, the temporary determination mode is continued on, and the learned value of the stoichiometry correction factor is adapted on the basis of normal learning sensitivity. Although the output of the $O_2$ sensor 23 on the downstream side of the three-way catalyst 21 tends to remain on the lean side as the three-way catalyst 21 deteriorates, since the learning sensitivity of the learned value of the stoichiometry correction factor is normal learning sensitivity, the exhaust gas air-fuel ratio on the downstream side of the three-way catalyst 21 shows a fluctuation state according to the deterioration of the three-way catalyst 21.

Accordingly, the fluctuation frequency of the exhaust gas air-fuel ratio on the downstream side of the three-way catalyst 21 increases gradually as the three-way catalyst 21 deteriorates, and whether or not the three-way catalyst 21 is deteriorated can be determined on the basis of an increase in the ratio between the fluctuation frequency of the air-fuel ratio on the downstream side of the three-way catalyst 21 and the fluctuation frequency of the air-fuel ratio on the upstream side (=the fluctuation frequency of the output of the $O_2$ sensor 23/the fluctuation frequency of the output of the LAF sensor 22).

Thus, according to the failure detection device of the engine 1 of this embodiment, since the temporary determination mode based on the number of R/L peaks N is executed under the control condition of normal learning sensitivity during normal engine operation, it is possible to execute determination of deterioration of the three-way catalyst 21 without any problem, as well as to concurrently determine whether or not there is an air-fuel ratio variation. If a temporary determination that there is an air-fuel ratio variation among the cylinders is made in the temporary determination mode, the determination mode is switched to the main determination mode and the learning sensitivity is re-set to the sensitive side, so that whether or not there is an air-fuel ratio variation among the cylinders can be determined properly with higher reliability. Thus, determination of deterioration of the three-way catalyst 21 and determination of air-fuel ratio variation among the cylinders, which have been hitherto in a trade-off relation, can be achieved at the same time at a higher level.

In the temporary determination mode, a normal value is set as the learning sensitivity of the learned value of the stoichiometry correction factor, while in the main determination mode, the learning sensitivity is set to more sensitive side. Therefore, during execution of the temporary determination mode, the situation is prevented in which the learned value of the stoichiometry correction factor is adapted excessively toward the rich side, and the situation is further prevented in which the actual air-fuel ratio is controlled improperly toward the rich side due to the correction of the median value of the LAF sensor 22 based on that learned value of the stoichiometry correction factor. Accordingly, the fluctuation frequency of the exhaust gas air-fuel ratio on the downstream side of the three-way catalyst 21 increases normally according to deterioration of the three-way catalyst 21, so that determination of deterioration of the three-way catalyst 21 can be executed properly on the basis of the ratio of the fluctuation frequency.

During execution of the main determination mode, since the learning sensitivity is set to the sensitive side, the value of the enrichment process counter C2 is more likely to be increased. Accordingly, if the air-fuel ratio on the downstream side of the three-way catalyst 21 remains on the lean side due to an air-fuel ratio variation among the cylinders, the value of the enrichment process counter C2 increases rapidly to exceed a predetermined value S2, so that a main determination that there is an air-fuel ratio variation among the cylinders can be quickly made.

Since the process of calculating the number of R/L peaks N on the basis of the deviation $\Delta AF$ executed in the temporary determination mode is continued in the main determination mode as well, if an air-fuel ratio variation among the cylinders is resolved for some reason, the determination mode is switched from the main determination mode back to the temporary determination mode on the basis of the number of R/L peaks, and at the same time the learning sensitivity of the learned value of the stoichiometry correction factor is set back to the normal value. Thus, it is possible to resume determination of deterioration of the three-way catalyst 21, which has been suspended, concurrently with the temporary determination mode.

Moreover, in the temporary determination mode, a high-frequency component contained in the output waveform of the LAF sensor 22 is taken note of as distortion in waveform of the air-fuel ratio on the upstream side of the three-way catalyst 21, and the degree of an air-fuel ratio variation among the cylinders is estimated on the basis of the number of R/L peaks N which has a correlation with this high-frequency component. Thus, a temporary determination that there is an air-fuel ratio variation is made, with no occurrence of an air-fuel ratio variation among the cylinders being overlooked, so that the determination mode can be reliably shifted to the main determination mode of higher reliability.

In conclusion of this description of the embodiment, it should be noted that the aspects of the present invention are not limited to this embodiment. For example, in the above embodiment, the present invention is embodied as the failure detection device of the straight four-cylinder MPI engine 1, but the type etc. of the engine is not limited to this example and can be changed arbitrarily.

In the above embodiment, the value of the enrichment process counter C2 is increased/reduced on the basis of the time for which the output of the $O_2$ sensor 23 remains in the counter addition region and the counter subtraction region. However, the present invention is not limited to this example, and, for example, the value of the enrichment process counter C2 may be increased/reduced on the basis of the result of a comparison between the output of the $O_2$ sensor 23 and a predetermined threshold value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A failure detection device of an internal combustion engine, comprising:
a catalyst provided in an exhaust passage of the internal combustion engine having a plurality of cylinders;
an upstream-side air-fuel ratio detector detecting an air-fuel ratio on an upstream side of the catalyst;
a downstream-side air-fuel ratio detector detecting an air-fuel ratio on a downstream side of the catalyst; and
a processor and a non-transitory computer readable media that stores a program that causes the processor to:

execute air-fuel ratio feedback control so as to match the air-fuel ratio on the upstream side of the catalyst, detected by the upstream-side air-fuel ratio detector, with stoichiometry;

determine, as a deterioration determination unit, a deterioration of the catalyst based on the air-fuel ratio on the upstream side of the catalyst detected by the upstream-side air-fuel ratio detector and the air-fuel ratio on the downstream side of the catalyst detected by the downstream-side air-fuel ratio detector;

determine, as a first air-fuel ratio variation determination unit, whether or not there is an air-fuel ratio variation among the cylinders of the internal combustion engine on the basis of distortion in waveform of the air-fuel ratio on the upstream side of the catalyst detected by the upstream-side air-fuel ratio detector;

determine, as a second air-fuel ratio variation determination unit, whether or not there is an air-fuel ratio variation among the cylinders on the basis that the air-fuel ratio on the downstream side of the catalyst, detected by the downstream-side air-fuel ratio detector, remains on a lean side;

as a determination mode switching unit, execute, by the first air-fuel ratio variation determination unit, a determination process concurrently with determination of deterioration of the catalyst by the deterioration determination unit, and if it is determined by the determination process that there is an air-fuel ratio variation among the cylinders, execute, by the second air-fuel ratio variation determination unit, a determination process in priority to determination of deterioration of the catalyst, the failure detection device further comprising:

a counter counting time, for which the air-fuel ratio on the downstream side of the catalyst remains on the lean side, with either high sensitivity or low sensitivity, wherein the determination mode switching unit switches the counter to the low sensitivity if it is determined by the first air-fuel ratio variation determination unit that there is no air-fuel ratio variation, and switches the counter to the high sensitivity if it is determined by the first air-fuel ratio variation determination unit that there is an air-fuel ratio variation, and the second air-fuel ratio variation determination unit determines that there is an air-fuel ratio variation among the cylinders when a value of the counter exceeds a predetermined value, wherein the program further causes the processor to, while the determination process by the first air-fuel ratio variation determination unit is being executed, correct a median value of the output of the upstream-side air-fuel ratio detector on the basis of the value of the counter switched to the low sensitivity.

2. The failure detection device of an internal combustion engine according to claim 1, wherein the determination mode switching unit makes the first air-fuel ratio variation determination unit continue with the determination process even after the determination process by the second air-fuel ratio variation determination unit has started, and if it is determined by the determination process of the first air-fuel ratio determination unit that an air-fuel ratio variation among the cylinders has been resolved, switches the counter from the high sensitivity back to the low sensitivity.

3. The failure detection device of an internal combustion engine according to claim 1, wherein the first air-fuel ratio variation determination unit executes the determination process on the basis of a high-frequency component which is contained in the waveform of the air-fuel ratio on the upstream side of the catalyst, the high-frequency component being distortion in waveform of the air-fuel ratio.

4. The failure detection device of an internal combustion engine according to claim 2, wherein the first air-fuel ratio variation determination unit executes the determination process on the basis of a high-frequency component which is contained in the waveform of the air-fuel ratio on the upstream side of the catalyst, the high-frequency component being distortion in waveform of the air-fuel ratio.

* * * * *